US005177507A

United States Patent [19]

Ng

[11] Patent Number: 5,177,507

[45] Date of Patent: Jan. 5, 1993

[54] SMALL SEGMENT ELECTROSTATOGRAPHIC IMAGE RECORDER

[75] Inventor: Yee S. Ng, Fairport, N.Y.

[73] Assignee: Eastman Kodak Company, Rochester, N.Y.

[21] Appl. No.: 676,499

[22] Filed: Mar. 28, 1991

[51] Int. Cl.[5] ........................ G01D 15/06; G03G 15/01

[52] U.S. Cl. .................................... 346/157; 118/645; 346/155; 346/160.1; 355/219; 355/232; 355/326

[58] Field of Search ............... 355/232, 237, 326, 327, 355/328, 245, 219, 235, 212; 118/645, 659, 660, 653; 346/155, 157, 160.1

[56] References Cited

U.S. PATENT DOCUMENTS

| | | | |
|---|---|---|---|
| 4,345,264 | 8/1982 | Hara | 346/155 X |
| 4,639,749 | 1/1987 | Ito | 346/153.1 |
| 4,690,539 | 9/1987 | Radulski et al. | 118/645 X |
| 4,767,689 | 8/1988 | Bibl et al. | 430/45 |
| 4,799,452 | 1/1989 | Day | 118/645 |
| 4,845,519 | 7/1989 | Fuse | 355/212 X |
| 4,947,195 | 8/1990 | Flynn et al. | 346/155 |
| 5,083,144 | 1/1992 | Altmann | 346/157 |
| 5,109,476 | 4/1992 | Thompson | 395/105 |

FOREIGN PATENT DOCUMENTS

| | | | |
|---|---|---|---|
| 0052155 | 3/1988 | Japan | 355/212 |

*Primary Examiner*—A. T. Grimley
*Assistant Examiner*—J. E. Barlow, Jr.
*Attorney, Agent, or Firm*—David A. Howley

[57] ABSTRACT

A color image is recorded in narrow band segments by rotating an image member having a cylindrical electrostatographic surface, creating an electrostatic latent image segment on a narrow band of the surface of the rotating image member, developing the latent image segment in a first color, repeating these steps on axially abutting portions of the image member surface until all image segments have been developed in the first color, transferring the developed image to a receiver, and repeating the steps for at least one more color. The latent image segment may be developed by applying pigmented toner particles thereto from a development station having a width corresponding approximately to the width of the image segment. The electrostatic latent image segments may be created by a write head having a width corresponding approximately to the width of the image segment; moving the write head between the axially abutting portions of the image member. The development station may be attached to the write head for movement therewith.

23 Claims, 2 Drawing Sheets

SMALL SEGMENT ELECTROSTATOGRAPHIC IMAGE RECORDER

CROSS-REFERENCE TO RELATED APPLICATION

Reference is made to commonly assigned U.S. patent application Ser. No. 07/597,138 entitled HYBRID COLOR PRINTER WHICH RUNS IN COMBINED SYNCHRONOUS AND ASYNCHRONOUS MODE filed in the name of John R. Thompson on Oct. 15, 1990.

BACKGROUND OF THE INVENTION

1. Technical Field

This invention relates generally to electrostatographic image recorders such as printers and copiers.

2. Background Art

Multicolor image recorders using electrostatographic processes are known. Most are complex and quite expensive due to their feature-rich design. However, many so called "personal" printer applications do not require the majority of the available features, as many users are more interested in having a small, lightweight printer that is reliable, inexpensive, compact, simple to operate, easy to equip with toner and other consumables, and which produces little waste.

Accordingly, there is a need for a small, reliable color image recorder that is nonetheless capable of producing good quality color pages at low cost.

Electrostatographic image recorders are known with exposure printheads having a long array of individually addressable and energizable point-like sources which extend across the full width of an electrostatic image receiver. The array may consist of a plurality of styli or radiation sources such as LEDs. Such long arrays are very expensive relative to the total price of many personal printers.

Many commercially available color personal printers are equipped with toner or ink supplies that contain a plurality of colors in a single unit. When one color has been exhausted, the user is presented only with the option of either (1) doing without that color until the other colors are used up or (2) replacing the unit and wasting the unused toner or ink.

DISCLOSURE OF INVENTION

In accordance with one aspect of the present invention, a color image is recorded in narrow band segments by rotating an image member having a cylindrical electrostatographic surface, creating an electrostatic latent image segment on a narrow band of the surface of the rotating image member, developing the latent image segment in a first color, repeating these steps on axially abutting portions of the image member surface until all image segments have been developed in the first color, transferring the developed image to a receiver, and repeating the steps for at least one more color.

During the process, the latent image segment may be developed by applying pigmented toner particles thereto from a development station having a width corresponding approximately to the width of the image segment. The electrostatic latent image segments may be created by means of a write head having a width corresponding approximately to the width of the image segment; moving the write head between the axially abutting portions of the image member. The development station may be attached to the write head for movement therewith.

The small segment image recorder according to the present invention is particularly suited for use with a hybrid system such as disclosed in commonly assigned U.S. patent application Ser. No. 07/597,138 entitled HYBRID COLOR PRINTER WHICH RUNS IN COMBINED SYNCHRONOUS AND ASYNCHRONOUS MODE filed in the name of John R. Thompson on Oct. 15, 1990, wherein a received stream of image data can be processed in portions corresponding to the size of the a narrow band segments.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The apparatus of the preferred embodiments will e described in accordance with an electrophotographic image recording process. It is to be understood that the invention relates to other types of electrostatographic recorders such as, for example, stylus recorders. Image recording processes include both printers and copiers.

The preferred embodiments are disclosed as drum-based image recorders for producing hard copy prints on a paper receiver, but other image members such as webs may be used in carrying out the invention. The invention is also not limited to the creation of images on a paper receiver, as other receiver media such as metallized or plastic film may also be used to advantage within the spirit of the invention.

Figure 1:
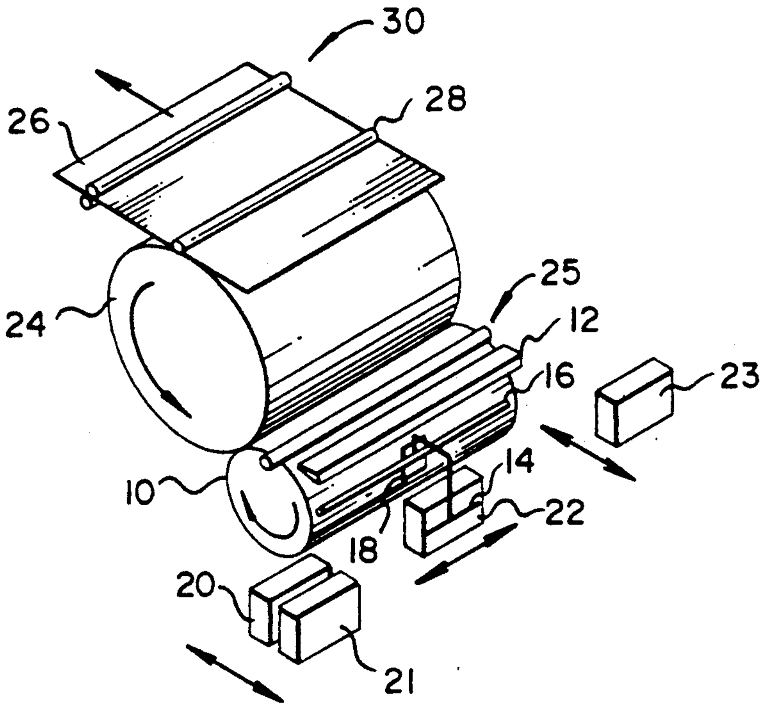
FIG. 1 is a schematic perspective view of a printer according to one embodiment of the present invention.

With reference to FIG. 1, there is shown a compact, electrophotographic color image recorder. The recorder includes an image member which, in the case of the illustrated embodiment, is a drum 10 having a recording medium such as a cylindrical photoconductive surface which is rotated under a primary charger 12 to bring the photoconductive surface to an initial voltage $V_0$.

A process module 14 is supported on a transport rail 16 for intermittent crosstrack movement across the photoconductive surface by driving means, not shown. Process module 14 includes an exposure device having an array 18 of individually addressable and energizable point-like radiation sources such as, for example, an LED array of, say, 128 elements. The exposure device also includes a lens array adjacent the radiation sources for transmission of their output to the photoconductive (electrostatographic) surface. The module also has a pick-up mechanism to selectively pick up and carry one of a plurality of small development stations 20–23. Timed rotation of drum 10 and movement of process module 14 is controlled by conventional logic and control unit circuitry to position the module (including printhead and development station) over a selected segment of drum 10. As the drum rotates and primary charger 12 charges the photoconductive surface, the printhead exposes a narrow band of the photoconductive surface to produce a latent image segment which is toned by the mounted development station; thus producing a narrow band toned image which is transferred to an intermediate drum 24.

As an illustration, if the recording surface's intrack dimension is 12 inches, if the image is to be recorded at a resolution of 300 dots per inch. and if array 18 has 128 point sources, then there will be 460,800 pixels in each band segment. Now, if the recorder is capable of recording, for example, 16 gray levels, each pixel will require four bits of data; and a buffer memory large enough to hold a band segment of data will require at least $2.304 \cdot 10^5$ bytes of data.

The recorder may run asynchronous, wherein a band segment of data can be processed at a time; even through transfer of the totally developed image must be effected synchronously. See the afore-mentioned, commonly assigned patent application to Thompson for a full disclosure of hybrid operation of a recorder. The printer can write a band of data from a small buffer, and then stop to wait for the next band. Large buffers capable of holding an entire page of data are not required.

As drum 10 continues to rotate, module 14 is indexed axially of the drum to the next adjacent segment and the process is repeated to transfer a toned image formed thereon to intermediate drum 24 before cleaning at a station 25. The module is repeatedly indexed and the process repeated until a complete one-color separation image has been transferred to the drum. Now the module transports the development station to the side of the printer and picks up another color development station. The process is repeated for that color separation, and the toned image is transferred to intermediate drum 24 in superposition with the preceding color separation.

Although there are a plurality of development stations, it is possible to provide only one development roller motor drive which is carried by the transport mechanism and which is used for each of the development stations. This will reduce the cost of the apparatus.

The development station can be shuttled back and forth between the two sides of the recorder to allow the transport mechanism to put down one development station, pick up a second, and transport the second across the development zone. By having two development stations on each side of the recorder, and having three slots for receiving development stations on each side of the recorder, the transport mechanism can deposit one station, pick up another, and begin printing without having to return to the original position, That is, the transport mechanism can pick up one station and start recording from, say, left to right, deposit the station on the right side of the recorder, pick up a second development station from the right side, and start recording from right to left.

When the last color separation of an image has been transferred to intermediate drum 24, a receiver sheet 26 is fed between the intermediate drum and a transfer back-up roller 28 so that the composite image can be transferred to the receiver sheet and fixed at fusing station 30.

After one segment of data has been recorded, drum 10 may be stopped to wait for the data for the next segment. If so, the circumference of intermediate drum 24 should be sufficient to allow for an interframe which is longer than the distance on drum 10 between primary charger 12 and the nip between intermediate drum 24 and drum 10. Of course, intermediate drum 24 may be designated from drum 10 during the wait period so that the diameter of intermediate drum 24 can be reduced.

Figure 2:
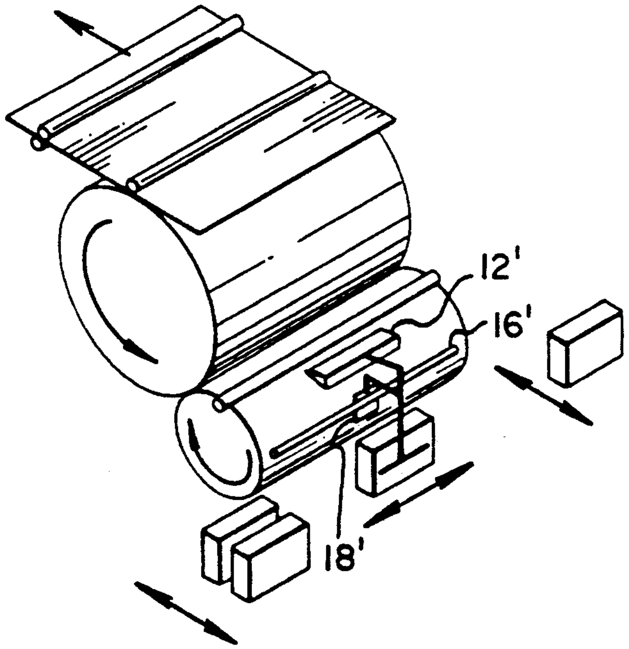
FIG. 2 is a schematic perspective view of a printer according to another embodiment of the present invention.

A second embodiment of the present invention is shown in FIG. 2. Note that a small primary charger 12' has been provided to replace the full-width charger 12 of the FIG. 1 embodiment. Small charger 12' is carried on transport rail 16' along with a printhead 18' and the development stations. By reducing the length of the charger, a cost reduction is realized.

Other elements of the embodiment shown in FIG. 2 ar identical to corresponding elements of the first-described embodiment. In the embodiments of FIG. 1 and FIG. 2, the drums can be smaller diameter than the in-tract length of the final image.

Figure 3:
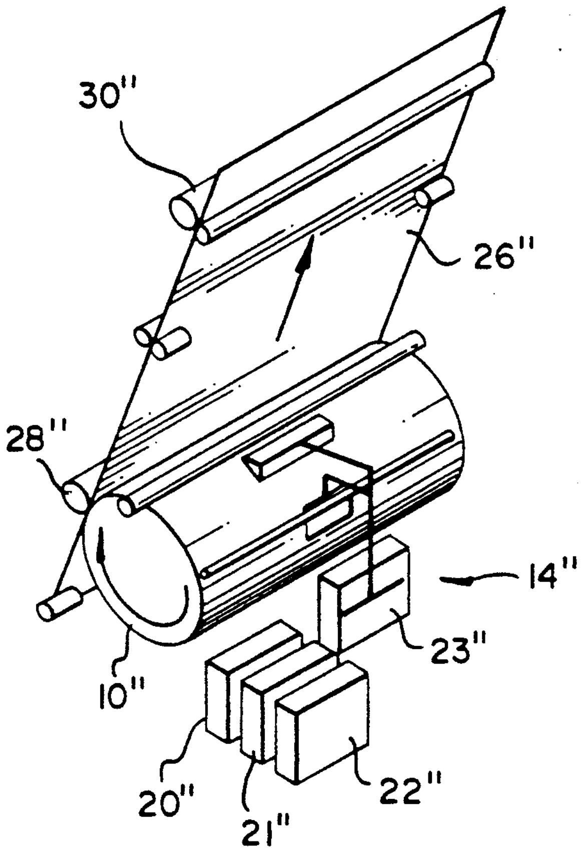
FIG. 3 is a schematic perspective view of a printer according to still another embodiment of the present invention.

In FIG. 3, all of the development stations 20''–23'' are stored on a single side of the apparatus. Process module 14'' will have no return to the original location to pick up the next development station, so time will have to be provided for the module to return. However, an advantage is realized by the elimination of the requirement of keeping track of the positions of the various development stations.

The development stations can be shuttled linearly back and forth as shown for positioning at a "pick-up" location, or a "Ferris wheel" type of transport may be used to position the development stations for pick-up. In "Ferris wheel" type of transport, several development stations are carried with the exposure module so that quick color change can be accomplished without requiring pick-up of a new station between colors. It should be noted that only one development motor will be required for all development stations.

Note also in FIG. 3 that there is no intermediate drum. A receiver sheet 26'' is transported back and forth by a set of paper drive rollers to acquire a single color toned image during each for ward pass. During the reverse direction pass, transfer back-up roller 28'' is backed off and a tension mechanism, not shown, pushes the sheet back to the transfer back-up roller to disengage the sheet from the drum 10''.

The drum can stop to wait for the receiver sheet to reach its initial position before printing resumes for the next segment. After the entire toned image is transferred to receiver sheet 26'', the image is fixed at fusing station 30''.

The invention has been described in detail with particular reference to preferred embodiments thereof, but it will be understood that variations and modifications can be effected within the spirit and scope of the invention.

What is claimed is:

1. A method of recording a color image in narrow band segments, said method comprising the steps of:
   (A) moving an image member having an electrostatographic surface;
   (B) creating an electrostatic latent image segment on a narrow band of the surface of the moving image member;
   (C) developing said latent image segment in a first color with a development station that is picked up and carried by a process module;
   (D) repeating steps (A) to (C) on axially abutting portions of the image member surface until all image segments have been developed in the first color;

(E) transferring the developed image to a receiver; and (F) repeating steps (B) to (E) for at least one more color.

2. The method as set forth in claim 1 further defined by developing said latent image segment by applying pigmented toner particles to said latent image segment.

3. The method as set forth in claim 2 further defined by applying toner particles from said development station said development station having a width corresponding approximately to the width of the image segment.

4. The method as set forth in claim 1 further defined by:

creating the electrostatic latent image segments with a write head having a width corresponding approximately to the width of the image segment; and moving the write head between said axially abutting portions of the image member.

5. The method as set forth in claim 4 further defined by applying toner particles from said development station said development station having a width corresponding approximately to the width of the write head.

6. The method as set forth in claim 5 further defined by applying toner particles from said development station, said development station being moved with the write head.

7. The method as set forth in claim 1 further defined by creating an electrostatic charge on the moving image member surface before creating each latent image segment, said electrostatic charge having a width corresponding approximately to the width of the image segment.

8. The method as set forth in claim 1 wherein said moving step comprises rotating an image member having a cylindrical electrostatographic surface.

9. Electrostatographic apparatus for recording images in narrow band segments, said apparatus comprising:

a moving support having an electrostatographic surface moving in an intrack direction;

a process module adapted to move intermittently in a cross track direction across the surfacer of said support, and having an array of individually addressable and energizable point-like radiation sources for sequentially imagewise writing to narrow bands of the electrostatographic surface to produce a series of adjacent latent electrostatic image segments of predetermined width; and a plurality of development stations, said process module being capable of selectively picking up and carrying one of said development stations at a time for developing each latent image segment before the next latent segment is created.

10. Electrostatographic apparatus as defined in claim 9 further comprising means to transfer a plurality of developed image segments forming a composite image simultaneously to a receiver.

11. Electrostatographic apparatus as defined in claim 10 wherein said development station creates different color developed image color separations.

12. Electrostatographic apparatus as defined in claim 11 wherein said development stations have a width corresponding approximately to said predetermined width.

13. Electrostatographic apparatus as defined in claim 9 wherein said array has a width corresponding approximately to said predetermined width.

14. Electrostatographic apparatus as defined in claim 13 wherein said development stations have a width corresponding approximately to said predetermined width.

15. Electrostatographic apparatus as defined in claim 13 wherein said development stations creates different color developed images, each of said developing stations having a width corresponding approximately to said predetermined width.

16. Electrostatographic apparatus as defined in claim 9 wherein:

said moving support is a rotatable drum; and said process module moves in a direction axially of said drum.

17. Electrostatographic apparatus for recording images in narrow band segments, said apparatus comprising:

a moving support having an electrostatographic surface moving in an intract direction;

a process module adapted to move intermittently in a cross track direction across the surface of said support, and having exposure means for sequentially imagewise exposing narrow bands of the electrostatographic surface to produce a series of adjacent latent electrostatic image segments of predetermined width; and a plurality of development stations, said process module being capable of selectively picking up and carrying one of said development stations at a time for developing each latent image segment before the next latent segment is created.

18. Electrostatographic apparatus as defined in claim 17 wherein said exposure means comprises a write head having a width corresponding approximately to said predetermined width.

19. Electrostatographic apparatus as defined in claim 17 wherein:

said exposure means comprises a write head having a width corresponding approximately to said predetermined width; and each said development station has a width corresponding approximately to said predetermined width.

20. Electrostatographic apparatus as defined in claim 17 wherein:

each said development station creates a different color developed image, each of said developing approximately to said predetermined width.

21. Electrostatographic apparatus as defined in claim 20 wherein said at least two developing stations are powered by a single power source.

22. Electrostatographic apparatus as defined in claim 17 wherein:

said moving support is a rotatable drum; and said process module moves in a direction axially of said drum.

23. Electrostatographic apparatus as defined in claim 17 wherein:

said exposure means includes an array of individually addressable and energizable point-like radiation sources and a lens array adjacent the radiation sources for transmission of their output to the electrostatographic surface; and drive means for energizing the radiation sources in response to image information.

* * * * *

UNITED STATES PATENT AND TRADEMARK OFFICE
CERTIFICATE OF CORRECTION

PATENT NO. : 5,177,507

DATED : January 5, 1993

INVENTOR(S) : Yee S. Ng

It is certified that error appears in the above-identified patent and that said Letters Patent is hereby corrected as shown below:

Claim 20, Column 6, lines 49-50 after "image" delete --, each of said developing approximately to said predetermined width--.

Claim 21, Column 6, line 52 after "wherein said" delete --at least two--.

Signed and Sealed this

Ninth Day of November, 1993

Attest:

BRUCE LEHMAN

*Attesting Officer*

*Commissioner of Patents and Trademarks*